United States Patent
Yahav

(10) Patent No.: US 9,852,217 B2
(45) Date of Patent: Dec. 26, 2017

(54) SEARCHING AND RANKING OF CODE IN VIDEOS

(71) Applicant: Codota Dot Com Ltd., Raanana (IL)

(72) Inventor: Eran Yahav, Haifa (IL)

(73) Assignee: CODOTA DOT COM LTD., Ra'anana (IL)

( * ) Notice: Subject to any disclaimer, the term of this patent is extended or adjusted under 35 U.S.C. 154(b) by 303 days.

(21) Appl. No.: 14/834,720

(22) Filed: Aug. 25, 2015

(65) Prior Publication Data

US 2016/0063102 A1    Mar. 3, 2016

Related U.S. Application Data

(60) Provisional application No. 62/041,744, filed on Aug. 26, 2014.

(51) Int. Cl.
*G06F 17/30* (2006.01)
*G06K 9/00* (2006.01)
*G06F 17/27* (2006.01)

(52) U.S. Cl.
CPC .... *G06F 17/30781* (2013.01); *G06F 17/2785* (2013.01); *G06K 9/00744* (2013.01); *G06K 9/00758* (2013.01)

(58) Field of Classification Search
CPC ......... G06F 17/30253; G06F 17/30781; G06F 17/30796; G06F 8/36; G06F 17/2785; G06K 2209/01; G06K 9/00711; G06K 9/00744; G06K 9/00718; G06K 9/00758
USPC .................................................. 382/305, 292
See application file for complete search history.

(56) References Cited

U.S. PATENT DOCUMENTS

| | | | |
|---|---|---|---|
| 6,608,930 B1 * | 8/2003 | Agnihotri | G06F 17/30796 382/173 |
| 6,937,766 B1 * | 8/2005 | Wilf | G06F 17/30253 348/468 |
| 9,009,664 B2 * | 4/2015 | Muddu | G06F 8/75 717/121 |

(Continued)

OTHER PUBLICATIONS

Reiss, Steven P. "Semantics-based code search." Proceedings of the 31st International Conference on Software Engineering. IEEE Computer Society, 2009.*

(Continued)

*Primary Examiner* — Jayesh A Patel
*Assistant Examiner* — Geoffrey E Summers
(74) *Attorney, Agent, or Firm* — Roach Brown McCarthy & Gruber, P.C.; Devin D. McCarthy

(57) ABSTRACT

A method comprising: receiving a multiplicity of videos from a source; for each video: receiving meta data related to the video; extracting from the video a video frame containing computer code; identifying a region of interest (ROI) within the video frame; performing OCR of the ROI to extract a code segment; analyzing the code segment by: semantically analyzing the code segment to obtain a first rank, structurally analyzing the code segment to obtain a second rank, and analyzing the meta data to obtain a third rank; and combining the first rank, second rank and third rank into a total rank associated with the code segment; receiving a query; matching the query to each code segment to identify matching code segments and associated videos; and providing the associated videos in accordance with total ranks associated with the matching code segments.

22 Claims, 5 Drawing Sheets

(56) References Cited

U.S. PATENT DOCUMENTS

| | | | |
|---|---|---|---|
| 9,407,942 B2* | 8/2016 | Brenneman | G06F 17/30796 |
| 2008/0072210 A1* | 3/2008 | Rush | G06F 8/33 |
| | | | 717/121 |
| 2010/0106705 A1* | 4/2010 | Rush | G06F 8/36 |
| | | | 707/709 |
| 2014/0112527 A1* | 4/2014 | Nister | G06K 9/3266 |
| | | | 382/103 |

OTHER PUBLICATIONS

Holmes, Reid, and Gail C. Murphy. "Using structural context to recommend source code examples." Software Engineering, 2005. ICSE 2005. Proceedings. 27th International Conference on. IEEE, 2005.*

Yang, Haojin, et al. "Lecture video indexing and analysis using video ocr technology." Signal-Image Technology and Internet-Based Systems (SITIS), 2011 Seventh International Conference on. IEEE, 2011.*

Rigby, Peter C., and Martin P. Robillard. "Discovering essential code elements in informal documentation." Proceedings of the 2013 International Conference on Software Engineering. IEEE Press, 2013.*

* cited by examiner

SEARCHING AND RANKING OF CODE IN VIDEOS

CROSS-REFERENCE TO RELATED APPLICATIONS

This application claims the benefit of priority under 35 USC §119(e) of U.S. Provisional Patent Application No. 62/041,756 filed Aug. 26, 2014, entitled "Searching and Ranking of Code in Videos", the contents of which are incorporated herein by reference in their entirety.

FIELD OF THE INVENTION

The invention relates to the field of computerized search.

BACKGROUND

Developers facing a programming task often look for readily available code snippets to be incorporated into their project. Such segments may be taken from publically-available projects, and in particular open source libraries and repositories, as well as from the user's organizational repositories or from code previously used or coded by the user.

Such incorporation has many benefits. First, it may save the user a significant amount of programming time. In some cases, a user may not even have the required expertise, for example programming for a specific graphic environment, in which case the usage of ready code may save a huge amount of time. Second, the code may have been used many times by developers of different organizations and disciplines, such that it has been tested over and over and its correctness is assured, thus saving long debugging periods.

Furthermore, the already tremendous amount of code available on the Internet grows on a daily basis. Code hosting sites may host millions of repositories containing tens of millions of source files (for example, "github" currently hosts more than 12 million projects. Search engines, including general purpose engines as well as dedicated search engines, are used for searching for pieces of code to answer a user's specific need. Many of these search engines merely check a simple textual correspondence with the search query and rank the results by the level of this correspondence, the recency of the code segments, (i.e., for how long a code has been posted in the repository), etc.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One aspect of the disclosed subject matter relates to a method for providing a video in response to a query, the method comprising using one or more hardware processors for: receiving a multiplicity of videos from a source; for each video: receiving meta data related to the video; extracting from the video a video frame containing computer code; identifying a region of interest (ROI) within the video frame; performing optical character recognition (OCR) of the ROI to extract a code segment; analyzing the code segment, said analyzing comprising: semantically analyzing the code segment to obtain a first rank, structurally analyzing the code segment to obtain a second rank, and analyzing the meta data to obtain a third rank; and combining the first rank, second rank and third rank into a total rank associated with the code segment; receiving a query; matching the query to each code segment to identify matching code segments and associated videos; and providing the associated videos in accordance with total ranks associated with the matching code segments. The method may further comprise displaying to a user a list of videos from which code segments being associated with highest ranks have been extracted. The method may further comprise displaying to a user a video from which the code segment has been extracted, wherein the video starts in a frame in which the code segment is displayed. The method may further comprise displaying to a user a list of additional videos related to a video from which the code segment has been extracted. Within the method, performing OCR of the frame optionally comprises using a statistical language model. Within the method, the statistical model is optionally associated with a programming language of the code segment. Within the method, performing OCR optionally uses results of semantic analysis of the code segment for enhancing results. Within the method, semantically analyzing the code segment optionally relates to one or more items selected from the group consisting of: cross-dependencies between the code segment and external code; a part of the code segment relevant to the query; and representatively of the code segment. Within the method, structurally analyzing the code segment optionally relates to one or more items selected from the group consisting of: simplicity; being error-free; and adjustment to coding style or common practice. Within the method, analyzing the meta data optionally relates to one or more items selected from the group consisting of: credibility of a user providing the code segment; credibility of a user recommending the code segment; characteristics of code previously viewed by a user searching for the code segment; code recency; code size; code credibility; code usability; upvotes; likes; dislikes; and number of comments. Within the method, the first rank, second rank and third rank are optionally combined into a total rank using a weighted average. Within the method, identifying a region of interest containing code within the video frame and performing OCR are optionally performed offline prior to a query being received. Within the method, the video frame is optionally a video frame containing an Integrated Development Environment (IDE) screen image, and wherein the ROI is a code containing pane of the IDE.

Another aspect of the disclosure relates to a computerized apparatus having a processor and a non-transient memory, the non-transient memory having stored thereon program code for execution by said processor, the program code comprising: a video receiving component for receiving a multiplicity of videos from a source; a meta data receiving component for receiving meta data related to each video; a frame extraction component for extracting from the video a video frame containing computer code; a frame analysis component for identifying a region of interest (ROI) within the video frame; and an OCR engine for performing optical character recognition (OCR) of the ROI to extract code segment; a semantic analysis component for semantically analyzing the code segment to obtain a first rank; a structural analysis component for structurally analyzing the code segment to obtain a second rank; a meta data analysis component for analyzing the meta data to obtain a third rank; a ranking component for combining the first rank, second rank and third rank into a total rank associated with the code segment; a query receiving component for receiving a query;

a query matching component for matching the query to each code segment to identify matching code segments and associated videos; and a result providing component for providing the associated videos in accordance with total ranks associated with the matching code segments. The apparatus may further comprise a user interface for displaying to a user a list of videos from which code segments being associated with highest ranks have been extracted. Within the apparatus, the user interface optionally displays to a user a video from which code segment has been extracted, wherein the video starts in a frame in which the code segment is displayed. Within the apparatus, the user interface is optionally adapted to display to a user a list of additional videos related to a video from which the code segment has been extracted. Within the apparatus, the OCR engine is optionally adapted to use a statistical language model. Within the apparatus, the statistical language model is optionally associated with a programming language of the code segment. Within the apparatus, the OCR engine is optionally adapted to use results of semantic analysis of the code segment. Within the apparatus, the video frame is optionally a video frame containing an Integrated Development Environment (IDE) screen image, and the ROI is optionally a code containing pane of the IDE.

Yet another aspect of the disclosure relates to a computer program product for providing a video in response to a query, the computer program product comprising a non-transitory computer-readable storage medium having program code embodied therewith, the program code executable by at least one hardware processor to: receive a video from a source; receive meta data related to the video; extract from the video a video frame containing computer code; identify a region of interest (ROI) within the video frame; perform optical character recognition (OCR) of the ROI to extract a code segment; analyze the code segment, comprising: semantically analyze the code segment to obtain a first rank, structurally analyze the code segment to obtain a second rank, and analyze the meta data to obtain a third rank; combine the first rank, second rank and third rank into a total rank associated with the code segment; receive a query; match the query to each code segment to identify matching code segments and associated videos; and provide the associated videos in accordance with total ranks associated with the matching code segments.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
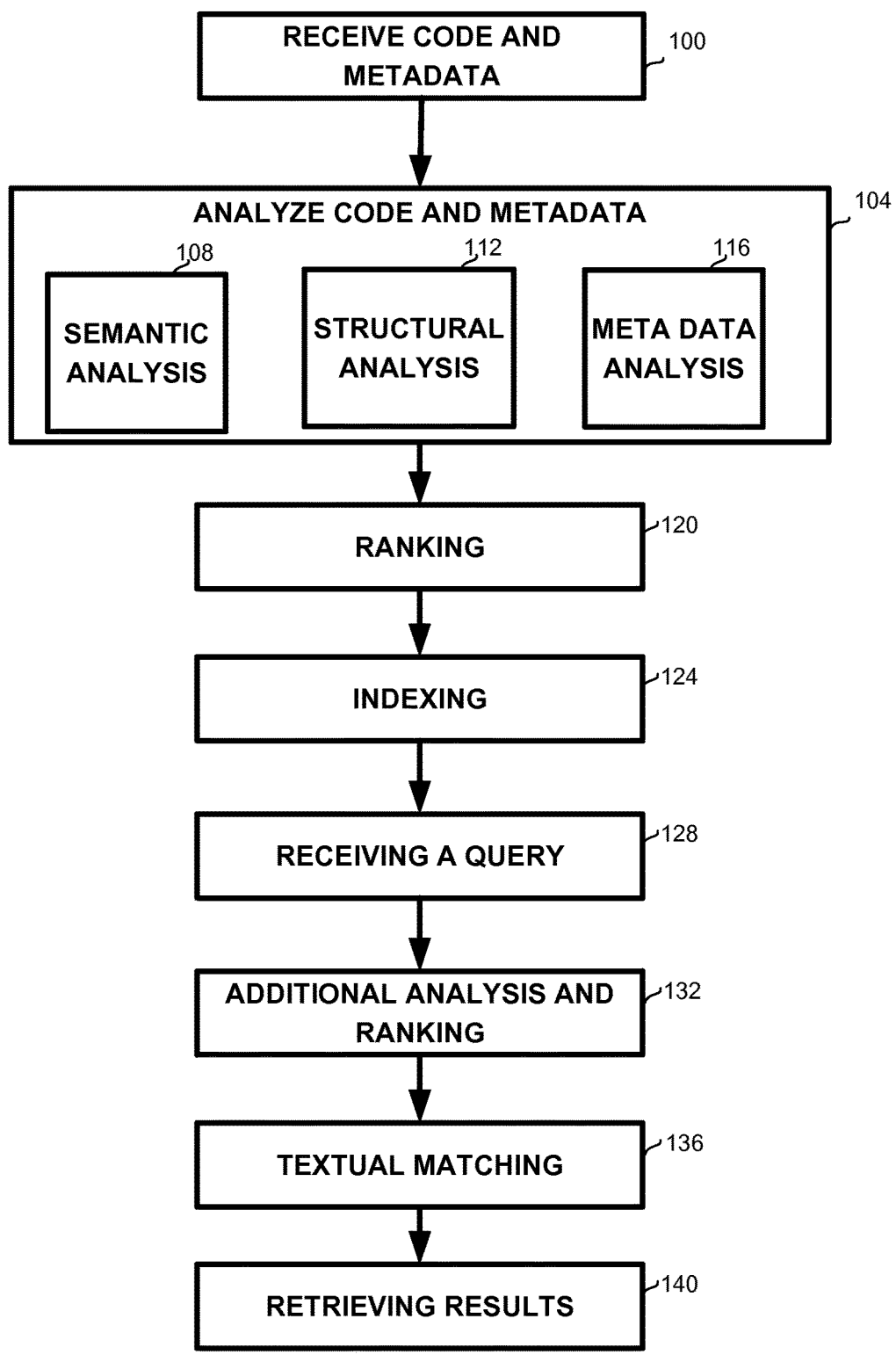
FIG. 1 is a flowchart of steps in a method for analyzing and ranking text segments, in accordance with some exemplary embodiments of the disclosure.

Disclosed herein is a method for ranking search results in a search engine of code snippets, also referred to as segments. Using the present ranking method, a user may receive top-ranked results in response to a query, wherein the code segments associated with the results are of high quality, for example have undergone extensive quality assurance, or were tested and found satisfactory by multiple users, and highly match the query. This provides for efficient usage of existing code repositories, efficient code retrieval and reuse, and overall increased usability.

According to the present ranking method, a score may be assigned to each segment (also "fragment" or "piece") of code, wherein the score (also "rank") is combined from a multiplicity of indicators. Thus, given a multiplicity of code segment from one or more sources, each may be assigned a score, the scores may be ranked and the top results may be provided to a user.

Optionally, responsive to receiving a query, some further analysis of one or more code segments may take place in view of the query, and the score assigned to the code segment may be enhanced.

Whether further analysis takes place or not, the query may be textually matched against the code segments to identify the code segments relevant to the query. The identified code segments having the highest score, and possibly sorted may then be provided to the user.

The rank may be determined statically, e.g. not requiring execution or even compilation of the code.

Advantageously, the present method may enhance the searching of code segments within code repositories. Programmers often look for code segments to be incorporated as part of their programming tasks, in order to fill knowledge and expertise gaps or to save precious programming and debugging time. However, locating appropriate code segments within huge repositories is often hard. Many existing code searching tools provide poor results, and, if at all, rank the results in a manner that does not reflect their actual usefulness. Such tools often treat code as a standard textual document and look for simple word matches. The present method may greatly enhance the relevancy of code search results.

The present method may be extended for handling code embedded in still images and/or video frames. Such code is expressed as an array of pixels in the bitmap of the image or video, and therefore requires conversion from bitmap to actual text to facilitate searching and ranking. This extension of the present method may be highly advantageous, since a large number of code segments are pictured in tutorial or instructional videos available on the Internet; these videos are often of high educational and professional quality, and provide not only good source code, but also explanations thereof, which add to its usability. Many existing solutions for searching code fragments in videos mainly rely on meta-data or basic automatic tagging of the video, often neglecting the code depicted in the videos. In the present method, however, efficient location and recognition of code embedded within such images and/or videos is performed; following the recognition, the code may be indexed, searched and retrieved like any other text, thus transforming code-related video from a collection of frames into a useful programming resource.

According to the present method, the multiplicity of score indicators for a segment of code may include one or more of the following:

1. Semantic information extracted from the code, related, for example, to (i) cross-dependencies, i.e., how well-encapsulated the code is, or to what degree it depends on its context, and/or (ii) internal purity, i.e., how much of the code fragment is relevant for the query, and how much relates to other operations not related to the query.

2. Structural information from the code itself, related, for example, to simplicity, e.g. how simple the code structure is, as may be indicated in looping structures, conditions structures, exception handling; and/or to cleanness, e.g. whether the code contains obvious syntax errors.

3. Representativity, e.g., how representative the code fragment is, namely how many and which other code fragments behave similarly. The representation may be determined by collecting characteristics of the code and comparing them to characteristics of other code segments, such that a higher accumulated similarity to other code fragments indicates higher representativity. The characteristics may include, but are not limited to, one or more of the items below: the collection of methods invoked from within the code; the collection of methods invoked from within the code with distinguishable parameters that may be determined statically, for example at compile time; the sequence of methods invoked from within the code, wherein sequence also relates to order; the sequence of method invoked from within the code with distinguishable parameters that may be determined statically; a deterministic automaton of method invocation (which unlike sequences may also capture looping or other structures); a deterministic automaton of method invocation with distinguishable parameters that may be determined statically. The semantic representativity extracted from each code fragment can be compared to other code fragments and used to compute a "support score" for each code fragment.

4. Recency information, e.g. how recent the code segment is, which may be based on metadata from the code repository.

5. Credibility, e.g., how credible the source of the code is, which may also be based on metadata from the code repository.

The one or more indicators may then be combined into a single score, for example using a weighted combination, and different code segments may be ranked upon this score.

As to the handling code embedded in still images and/or video frames, Optical Character Recognition (OCR) may be used as a preliminary step. However, the abilities provided and the resources consumed by many current OCR technologies are limiting for the presently-intended purpose. In order to overcome these limitations, the present method may analyze the nature of the specific text making up the code. Since it is known that the code is in some programming language, this allows for using a statistical language model to improve OCR recognition and turn the code into useful tags that can be used to index the tutorial video. As a simple example, in C code, it is likely to find the words "for", "switch", "function", etc., while in C++ code it is also likely to find the words "method", "class", etc. Furthermore, the language model allows not only local (per word) recovery, but also recovery based on the semantic relationships between language elements. A simple example is a use of an n-gram model over textual elements. A more advanced example is the use of language models over semantic elements extracted from the program corpus, such as common data/control flow. Additionally, tutorial videos often display code segments, for example frames comprising a region of interest containing code, or frames comprising a screenshot of an integrated development environment (IDE), in which code is being developed. The IDE layout is usually quite known and contains a large code pane at the central area of the screen. Thus, it may be useful to first locate the relatively large pane at the center of the screen, and recognize only the text within this pane. The text recognition may be enhanced by the domain-specific terms, as detailed above.

Once the text is recognized, it may be indexed and searched like any other text. For example, it may be ranked using the same considerations as described above. In addition, the point or points in time within the video at which the text is displayed may be stored, such that, in the search results, the video may be displayed starting at that point in time where the text is displayed. The text as recognized may also be displayed to the user, such that the user may copy, search or otherwise use it. Additional videos found to be similar to the selected video may also be suggested to the user.

Referring now to FIG. 1, showing a flowchart of steps in a method for analyzing and ranking texts.

On step 100, code fragments and possible metadata are received from a source. A code fragment is a contiguous piece of code from a program. The fragment may or may not comprise a full executable or compilable piece of code, such as a function, a method, a class, or the like.

The source may be an open-source repository, which may be a site storing a large number of open-source projects, files, code fragments or snippets. Other type of sources may be community question and answer sites, which may store a multiplicity of professional questions and answers, wherein the question or the answer may contain code fragments. Yet another type of code source may be a tutorial site, containing educational materials for programmers, related for example to the use of libraries, frameworks and platforms. Such sites typically include illustrative code fragments and explanations. Some code sources may be official documentation sites, containing official documentation for libraries, frameworks, and platforms, which may also include illustrative code fragments and explanations, structured documentation of the library APIs, and the like.

It will be appreciated that the source may also be internal, for example a collection of code fragments programmed by the user or by the user's group or organization.

It will also be appreciated that the code sources are not limited to the list above, rather any repository or website that hosts code can be used as a data source for analysis and ranking. Some of the signals or ranks disclosed below may be fine-tuned to the specific data source used.

The metadata may include but is not limited to any one or more data items of the following: provider data, such as the provider's credibility as ranked by users; statistics related to the code segments such as upvotes, likes, dislikes, number of comments, or the like; data related to the user, such as credibility or characteristics of code previously viewed by the user; data related to the file containing the code, such as recency, size, or the like.

On step 104 the code and metadata may be analyzed using one or more analysis types, such as but not limited to the types listed below. Each type of analysis used may be performed separately to obtain a rank, wherein the separate ranks may later be combined into a total rank. It will be appreciated that some of the analysis may be performed standalone, i.e. based on the code regardless of the query, while other measures are related to the specific query. The standalone measurement may be performed offline, for example when the code is added to the repository or anytime afterwards, such that the analysis results are available and ready to use when a query is received on step 128. It will be appreciated that although various analysis options are described below in association with steps 104, those analysis steps that require a query may be performed at a later stage, e.g. additional analysis step 130 which is performed after a query was received on step 128. For any type of analysis mentioned below it is noted whether a query is required or not.

On step 108 semantic analysis may be performed, which may include extracting semantic data from the code itself. The semantic data may include but is not limited to any one or more of the following:

1. Cross-dependencies: how well-encapsulated the code is, e.g. to what degree the code depends on the context in which it is used, such as how much it uses external libraries or other code, how much pseudo code that has to be further developed it contains, etc. For example, a piece of code that makes many calls to functions or methods not included in the code snippet may be considered inferior to self-sustained code. This measurement may be performed standalone.

2. Internal purity, e.g. how much of the code fragment is relevant for the query, and what part of the code relates to other operations intertwined with the code of interest. This measurement can be analyzed, for example, by assessing the number of code lines associated with the query vs. the total number of code lines. This measurement may relate to and require a specific query.

3. Representativity: how representative the code fragment is, e.g. how many, and optionally which other code fragments behave in the same manner. Determining this measure may include semantic analysis of what the code does, and comparison of this semantic information to information extracted from other indexed code fragments. The semantic analysis may include but is not limited to any of the following: the collection of method or function invocations; the collection of method or function invocations distinguished by statically determined parameter values (e.g. parameter values that may be determined at compile time); the sequence of method or function invocations; the sequence of method or function invocations distinguished by statically determined parameter values; deterministic sequence of method invocations, which differs from the sequence described above by taking into account also looping or other control structures; deterministic sequence of method invocations distinguished by statically determined parameter values; or sequence of field accesses (put/get).

Any one or more of the abovementioned characteristics may be determined for any code fragment and compared to the characteristics of other code fragments to obtain a similarity measure. The accumulated similarity measure between the specific code segment being ranked and all other code segments may provide an indication of how representative the code segment is. This measurement may be performed standalone, e.g., regardless of a specific query. However, it may be performed for only some of the functions or methods, for example those related to the query, in which case it may be performed only when the query is received.

It will be appreciated that in assessing the factors above, the method may track a receiver of an event even when using aliasing and through method calls, thus reducing noise (e.g. ignoring irrelevant code parts) related to surrounding objects and calls. The method may also track control flow such as conditional or looping structures.

On step 112, structural information may be retrieved from the code. The structural information may include but is not limited to any one or more of the following:

1. Simplicity: how simple the code fragments is, in terms of looping or other control flow structures, conditional structures, exception handling, function or method nesting, or the like. This measurement may be performed standalone.

2. Cleanness: whether the code contains incorrect or problematic syntax usage or other semantic violations, e.g., cases of null deference, empty blocks, variable repetitions, or the like. This measurement may also be performed standalone. This step may also check that the code does not correspond to commonly known security breaches or bad practices.

3. Adjustment to coding style or common practice: to what degree the coding style is consistent with a style or practice acceptable by the user, or the like.

On step 116, meta data analysis may be performed. For example, any one or more of the following factors may be considered:

1. Code recency: how recently the code was added to the repository. A too old code may not be up-to-date in using current techniques and tools. On the other hand, too new code may not have been tested yet and may contain problems or mistakes.

2. Credibility: how credible the source of the code is, or what is the credibility of its recommenders, if any.

3. Usability: how often the code was downloaded or otherwise used by users.

Meta data analysis may also refer to any one or more of the following: characteristics of code previously viewed by a user searching for the code segment; code size; code credibility; upvotes; likes; dislikes; number of comments, or the like.

Metadata analysis may be performed regardless of a specific query, but may be updated from time to time as some factors may change over time.

Once analysis step 104 is done, and possibly after the code segment has been available for other users, some or all of the following data may be available for each code segment: the original textual representation of the snippet; the code rank assigned to the code segment based on structural and semantic analysis; social indictors such as: upvotes, downvotes, number of times the segment was copied, number of times full-source of the snippet were requested, number of times alternate snippets (of the same page) were chosen; grammar based tagging of the original snippet including for example names of classes in the snippet, names of methods in the snippet, names of variables in the snippet; and a Deterministic Finite Automaton (DFA) providing semantic description of the snippet.

It will be appreciated that further types of information that may be computed regardless of a specific query may also be available.

On step 120 the analysis results may be combined. The rank may be based, for example on a weighted average of the code rank and the social signals.

Extracting and combining data related to different aspects of the code provides a more comprehensive rank, which may result in better correspondence to the user's need, and retrieval of more useful code fragments.

On step 124 the code fragment may be indexed, e.g., its fragments, analyses results, partial results or ranks may be stored in a repository such as a database.

On step 128, a query may be received from a user. The query may be received in free text, as a code segment for which it is required to find similar segments, as text tagged with element kind (for example class:MediaRecorded, method:getCurrentLocation, as an a automaton or regular expression for advanced search, or in any other manner.

On step 132, additional analysis may be performed, and in particular the types of analysis that require a query, for example internal purity and some aspects of representativity as detailed above. Step 132 may also comprise enhancing of the rank determined on step 120 in accordance with the results of the additional analysis It will be appreciated that other analysis may also be performed given a specific query. However, in some embodiments, step 132 may be omitted and the rank may remain as determined on step 120.

On step 136, the query may be matched textually to the code segments, to extract the code segments that are relevant for the code.

If the query is provided as free text, then auto-completions may be suggested for the given query matching. The suggestions may first include method names, followed by suggestion of class names (or the other way around). If none of these auto-completions are chosen by the user, the free text may be used to match the document based on standard textual matching. Specifically, using standard term frequency-inverse document frequency (TF-IDF) similarity.

If the query is provided as text with tagged elements, only documents in which the text appears in the correct syntactic role are matched. For example, a query containing "class:MediaRecorder" will only match snippets in which the term "MediaRecorder" appears as a class name, ignoring for examples snippets in which this term appears in a comment, or in a different syntactic role.

If the query is provided as a matching code snippet, then first a set of tagged search terms are extracted from the query snippet, and used to query the database. Once the tagged terms have been extracted, search proceeds as in the case for tagged text elements detailed above.

If the query is provided as an automaton or regular expression (which may represent an automaton), the matching is based on matching of deterministic finite automatons, which may be done using any method currently known or that will become known in the future, for example matching of sub-sequences. In some embodiments, query matching step 136 may be performed prior to additional analysis step 132 based on the results of analysis step 104 and ranking step 120, such that only the documents that match the query undergo the additional analysis.

On step 140 results may be provided, for example the code fragments that received the highest ranks on step 120 or 132. In some embodiments, a predetermined number of code segments that received the highest ranks may be provided. In other embodiments, all code segments may be provided sorted by the ranks. In further embodiments, the code segments that received the top predetermined percentage ranks, for example the top 10% may be provided.

The results may be provided to the user by displaying a list of code segments, optionally with a rank and optionally with a snippet of the code.

For example, a search for android.media.MediaRecorder may be considered. A query "android.media.MediaRecorder" yields tens of thousands of results, wherein the results ranked highest by current engines simply contain code showing inheritance from the class MediaRecorder and no useful code example (as they are based on textual matching in a which a short document that contains the target term multiple times is considered a good match). Other results just declare a field of type MediaRecorder and also contain no useful code (again, based on textual matching). However, when using the method described above, the highest ranked code demonstrates the use of this class, by populating its fields and calling relevant methods.

Figure 2:
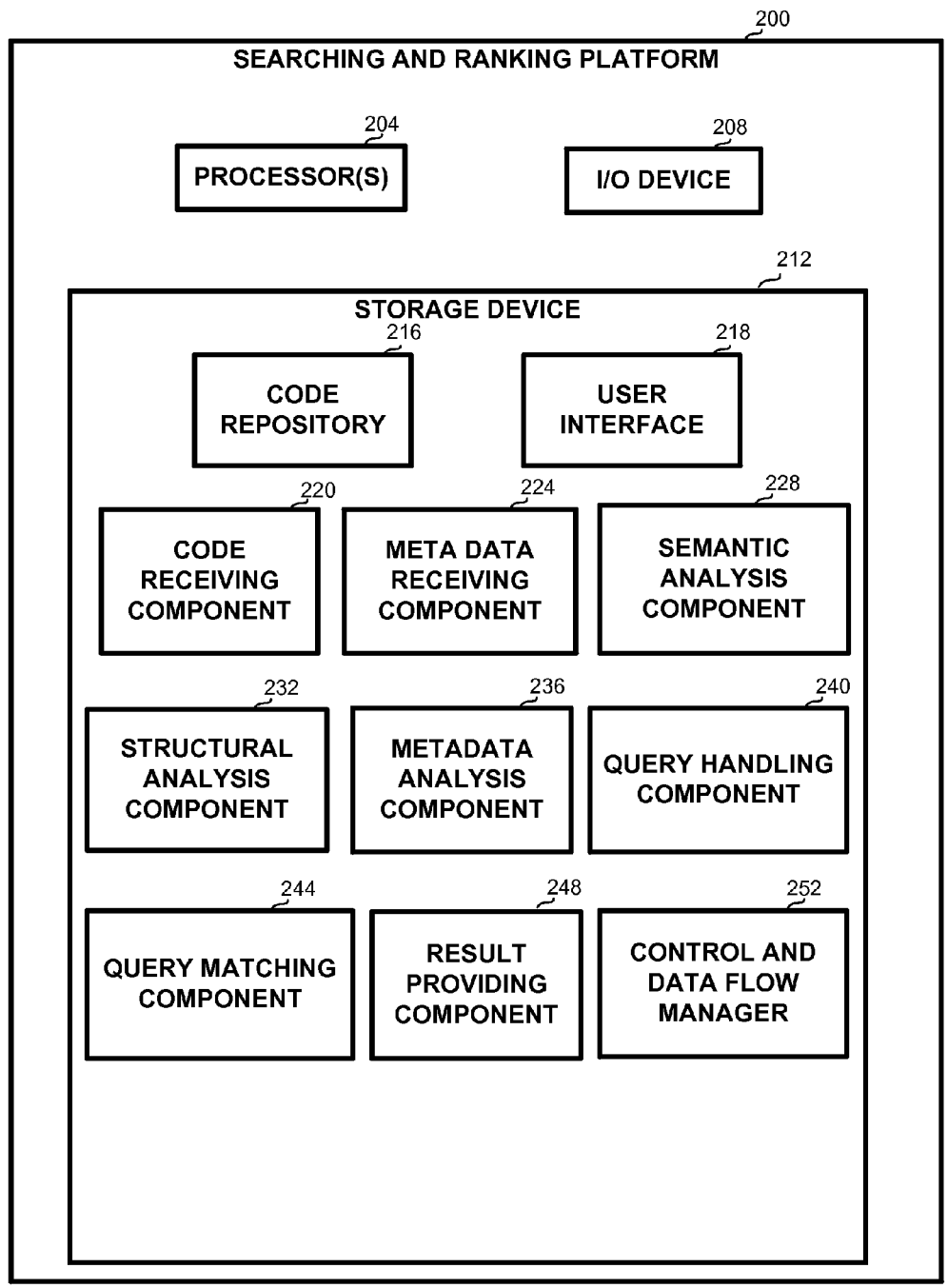
FIG. 2 is a block diagram of elements in a system for analyzing and ranking texts, in accordance with some exemplary embodiments of the disclosure.

Referring now to FIG. 2, showing a block diagram of elements in an apparatus for searching and ranking texts.

In some exemplary embodiments, apparatus 200 may be implemented as a computing platform such as a server, a personal computer, a combination in which some parts are implemented on a server and others on a personal computer, or the like Apparatus 200 may comprise one or more processor(s) 204. Processor 204 may be a Central Processing Unit (CPU), a microprocessor, an electronic circuit, an Integrated Circuit (IC) or the like. Processor 204 may be utilized to perform computations required by the apparatus 200 or any of it subcomponents.

In some exemplary embodiments of the disclosed subject matter, platform 200 may comprise an Input/Output (I/O) device 208 such as a display, a pointing device, a keyboard, a touch screen, or the like. I/O device 208 may be utilized to receive input from and provide output to a user.

In some exemplary embodiments, platform 200 may comprise a storage device 212. Storage device 212 may be a hard disk drive, a Flash disk, a Random Access Memory (RAM), a memory chip, or the like. In some exemplary embodiments, storage device 212 may retain data or program code operative to cause processor 204 to perform acts associated with any of the subcomponents of platform 200. Some components detailed below may be implemented as one or more sets of interrelated computer instructions, executed for example by processor 204 or by another processor. The components may be arranged as one or more executable files, dynamic libraries, static libraries, methods, functions, services, or the like, programmed in any programming language and under any computing environment. In some embodiments, storage device 212 may comprise a multiplicity of storage devices, one or more of which may be remote and in communication with platform 200.

Storage device 212 may comprise or be in communication with one or more code repositories 216, each comprising code segments. Each code segment may be a full or partial program, and may be executable or not and may compile or not.

Storage device 212 may comprise user interface 218, for a user to enter query, receive results such as a list of code segments and associated ranks, a listing of one or more code segments, or the like.

Storage device 212 may further comprise code receiving component 220 for receiving a code for analysis or ranking. The code may be received by the user entering the code, through communication from a remote source, in a file, or the like.

Storage device 212 may also comprise meta data receiving component 224 for receiving meta data associated with one or more code segments. The meta data may relate to a provider of the code, to the code itself, to one or more users of the code, or the like. The meta data may be received as text from a user, received through a communication device, retrieved from a data base, or the like.

Storage device 212 may also comprise semantic analysis component 228 for performing semantic analysis of a code segment, with or without reference to a particular query, as described in association with step 108 of FIG. 1 above.

Storage device 212 may also comprise structural analysis component 232 for performing structural analysis of a code segment, with or without reference to a particular query, as described in association with step 112 of FIG. 1 above.

Storage device 212 may also comprise meta data analysis component 236 for performing structural analysis of a code segment, with or without reference to a particular query, as described in association with step 116 of FIG. 1 above.

Storage device 212 may also comprise query handling component 240 for handling a query, for example receiving and parsing the query.

Storage device 212 may also comprise query matching component 244 for identifying code fragments which may be relevant to the user's query. The identified code segments may be further analyzed in view of the specific query, for example by activating semantic analysis component 228, structural analysis component 232, meta data analysis component 236 or other analysis engines. An enhanced query-specific rank may be assigned to each such code segment.

Storage device 212 may further comprise result providing component 248 for selecting the highest ranked segments to be provided to a user in response to the user's query. Alternatively, the code segments may be ordered according to the ranks, and the highest ranked code segments may be provided to the user. Sorting the ranks may be performed by query matching component 244, by result providing component 248 or by a separate component.

Storage device 212 may also comprise control and data flow manger 252 for managing the process and activating the required components with the relevant data, for example providing the query and a code fragments to the analysis components, providing the results, or the like.

The method and apparatus may be used in general code search engines, for example when searching code on specific websites. However, the method may also be used locally when searching the user's own code, for example from within an IDE. Further, the ranking may be used as a basis for automatic code-completion in an IDE, where the highest ranked code is suggested as completion in response to a partial code fragment interpreted as a query.

The method and apparatus do not rely on word or pattern matches alone to rank code, as is done by current techniques. Rather a ranking scheme that combines different aspects provides better match to the user's needs. The method does not require full executable programs but may use any arbitrary code segment. Thus, the code may or may not execute and may or may not compile.

Figure 3:
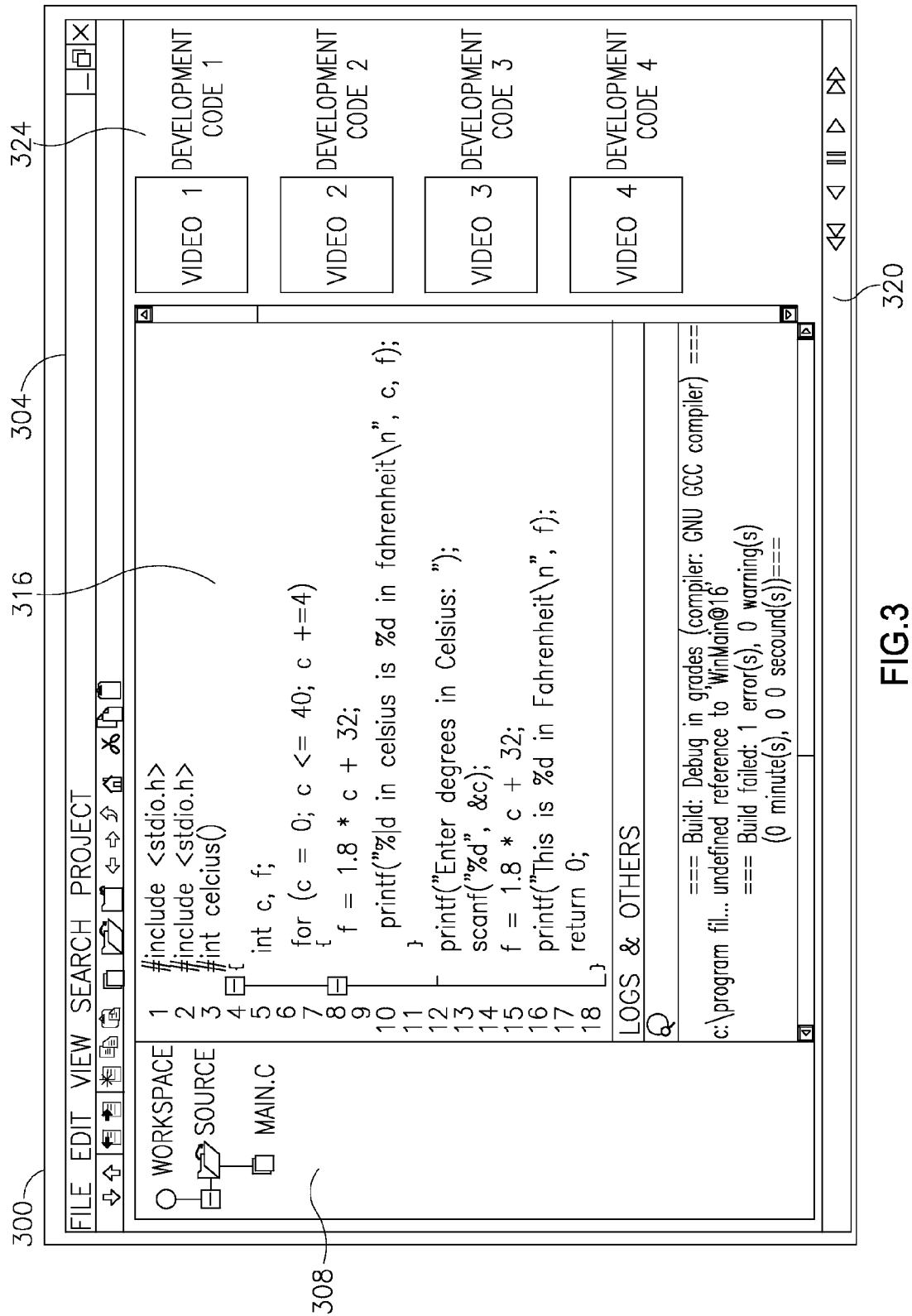
FIG. 3 is an image of an integrated development environment screen, in which it is required to recognize text, in accordance with some exemplary embodiments of the disclosure.

Referring now to FIG. 3, showing a video presentation page 300, in which a frame 304 showing an IDE screen is displayed.

Many video streams such as tutorial videos comprise frames showing an IDE containing code. Such videos may be an important source of information when a user is searching for code segments. However, the code segments are not displayed as text but rather as images or video frames within videos.

Frame 304 may be such frame of a video stream, in which the audio of the video may comprise explanations to the displayed screen, and wherein the video may comprise further frames showing further screens of the IDE, additional explanations, a frontal lecture, or the like.

The IDE screen shown in frame 304 comprises a few panes, which may vary in accordance with the type of project being developed, user preferences, development stage, or the like. Thus frame 304 may comprise for example project pane 308, message pane 312, and possibly additional panes. During most if not all of the development time, an IDE screen as shown in frame 304 comprises code pane 316, displaying code in a programming language such as Java, C#, C++, or the like.

Once one or more video streams have been analyzed to retrieve code segments, if such video is ranked high enough and is selected to be displayed to a user, video display page 300 may display the video, starting immediately at frame 304 or another frame showing the IDE screen. The user can scan the video back and forth using the buttons at control area 320, view the frames, and listen to the explanations.

Side bar 324 may suggest to the user other video streams that came up in the search and ranking, such that clicking or otherwise pointing at any of them will start displaying that video in the point of time in which the relevant code segment is displayed.

Additionally, a particular area of the screen may show the code in textual manner, from which the user may copy the code.

Figure 4:
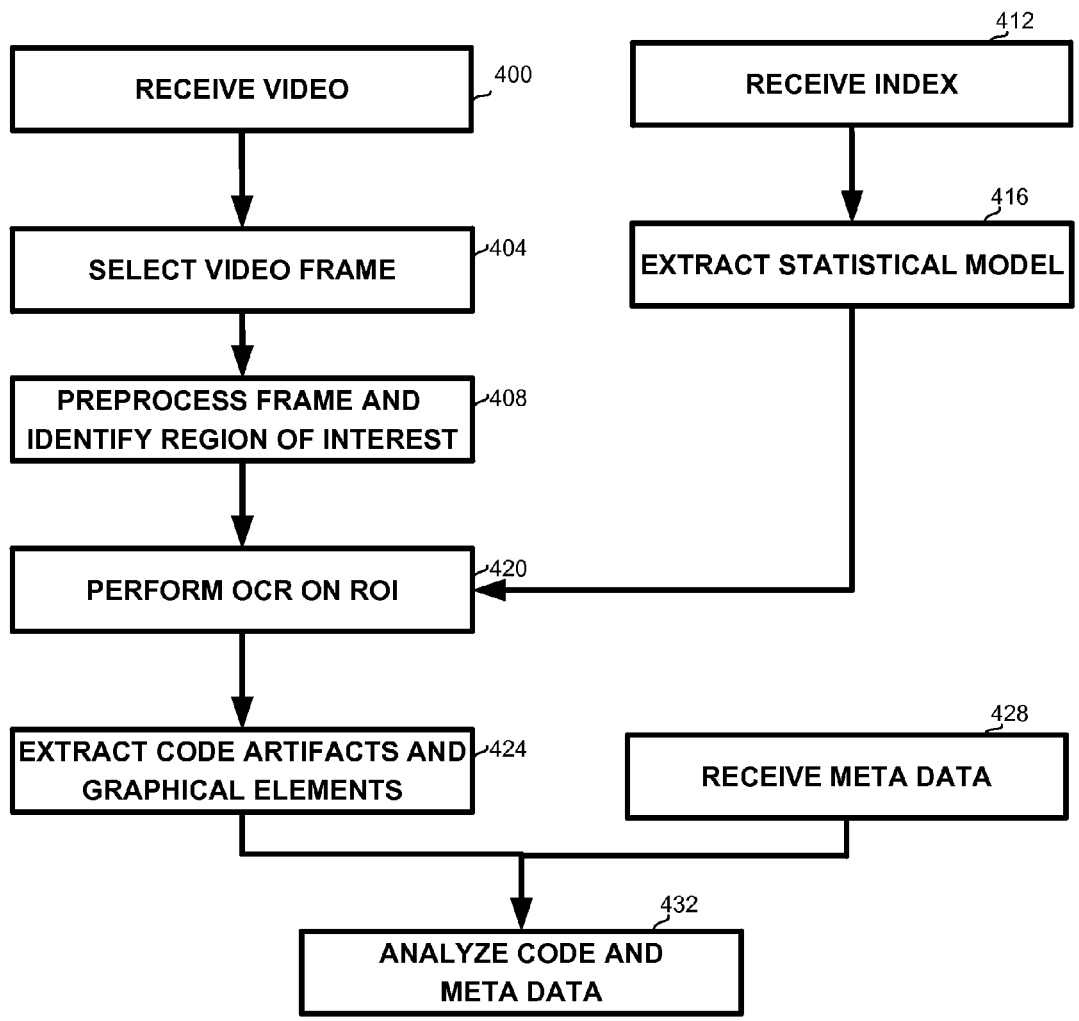
FIG. 4 is a flowchart of steps in a method for analyzing and indexing videos or images comprising code, in accordance with some exemplary embodiments of the disclosure.

Referring now to FIG. 4, showing a flowchart of steps in a method for analyzing and indexing videos or images comprising code.

On step 400 a video file or stream may be received, which may contain images of code segments. The video may be received from an open source repository, a tutorial site, a questions and answers page, or the like.

On step 404 one or more frames may be selected from the video. The frames may be selected using fast analysis that identifies that a multiplicity of letters exist in a region of interest of the frame, the general structure of an IDE screen, or similar hints that may suggest that the frame contains code. If the video is compressed using for example MPEG compression, then it is easy to scan the video by scenes, such that it is not required to scan each frame.

On step 408 the selected frame may be preprocessed such that a region of interest, such as pane 316 of FIG. 3, is identified.

On step 412 an index may be received, for example containing words or word combinations that are likely to be included in a code segment, syntax artifacts such as the characters indicating a comment, or the like.

On step 416 a statistical model, such as but not limited to a statistical language model may be extracted from the index, comprising for example word frequency, bigram or other word combinations, or other helpful hints for analyzing what is known to be a code segment.

On step 420, the region of interest, such as the region identified as containing the code may undergo OCR, optionally using the statistical model determined or received on step 416. It will be appreciated that the OCR results may be enhanced and undergo error correction using results of the semantic analysis. For example, if a type named "person" is identified, and later a token "persom" is identified where a type is expected, it may be assumed that it should be corrected to "person". It will be appreciated that limiting the OCR to the region of interest, using a relevant statistical model, or correcting error based on the semantic analysis may improve the time efficiency as well as the result quality of the OCR.

On step 424, once the code is available, code artifacts such as words, control structures, class names, function names, or the like, and graphical elements such as the bounding box of the pane may be extracted.

On step 428 meta data may be received, similarly to the metadata received on step 100 of FIG. 1, which may include data related to the video, to the provider, or the like.

On step 432 the code as extracted from the video, together with the meta data receive on step 428 may be analyzed, similarly to the analysis detailed in association with step 104 of FIG. 1.

Execution may then continue similarly to steps 120 and further detailed above, including ranking, receiving a query, possibly performing additional analysis and ranking of the code segments in view of the query, textual matching of the query to the code segments, and retrieving the results. The video segments may be retrieved with the relevant information, such as the location of the code image within the video, the code in textual representation, or the like.

The video, optionally starting at the relevant time, and optionally with the code as extracted, may then be provided to the user, for example by displaying to the user the highest ranked video (or any other video), optionally starting at the point in time in which the code is displayed. Additional code segments which may be related, for example due to also being assigned high ranks, may be suggested to the user on a side bar such as side bar 324 of FIG. 3.

Figure 5:
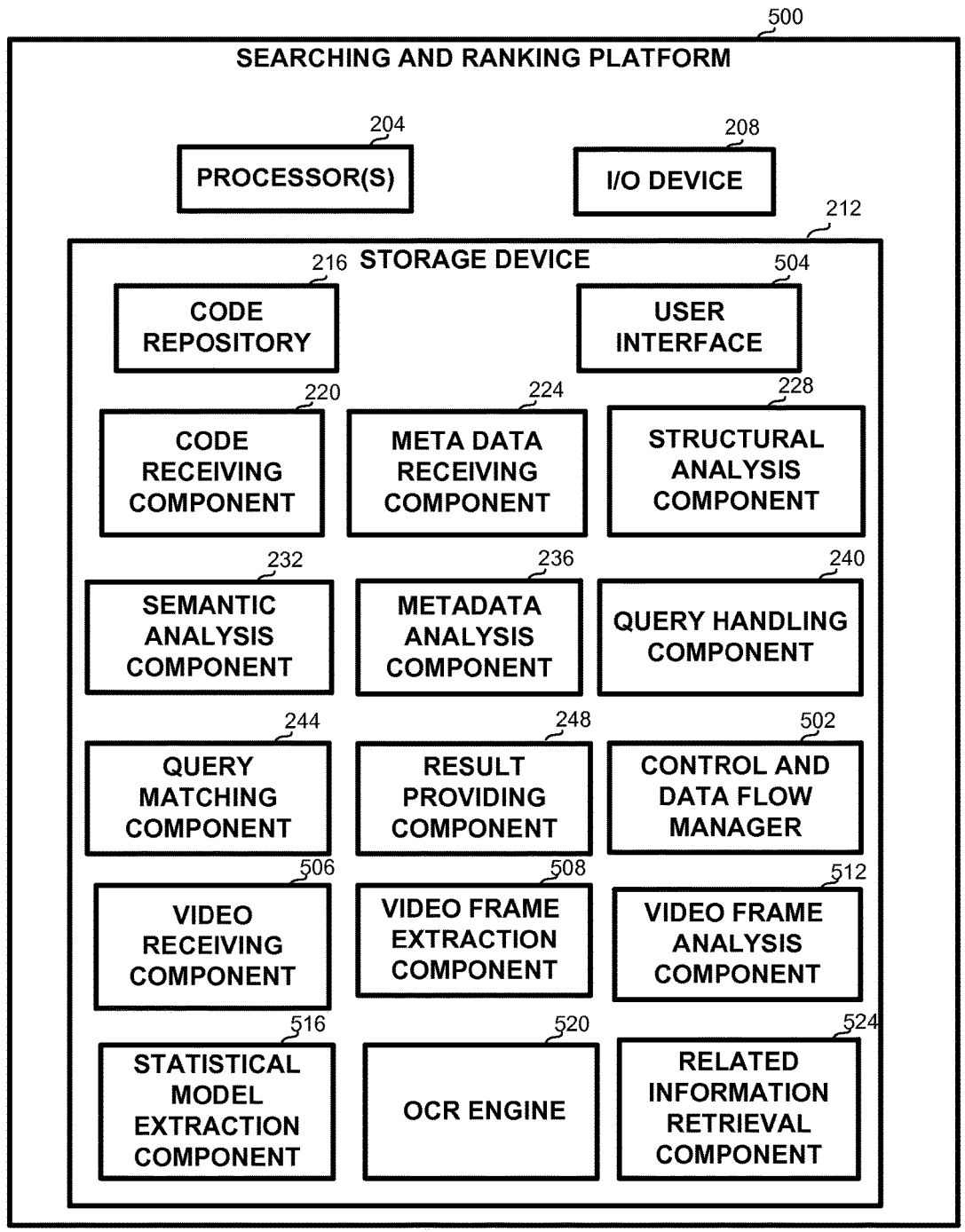
FIG. 5 is a block diagram of elements in a system for analyzing and indexing videos or images comprising code, in accordance with some exemplary embodiments of the disclosure.

Referring now to FIG. 5, showing a block diagram of elements in an apparatus for analyzing and indexing videos or images comprising code.

FIG. 5 shows the components of an apparatus for searching and ranking code, similarly to FIG. 2 above. Additionally, FIG. 5 shows further or different elements for searching and displaying code within video segments. The components of FIG. 5 having the same number as in FIG. 2 correspond to the elements of FIG. 2, possibly with the required changes. Different or additional components in an apparatus for displaying results which may include video comprising code may include the following.

User interface 504 may be adapted to display code in textual manner as before, and in addition to display video as shown in FIG. 3 above. A displayed video may automatically start at a point in which the required code is displayed. Additionally, the code extracted using OCR may also be displayed, or may at least be accessible by following a link.

Storage device 212 may comprise control and data flow manger 502 for managing the process and activating the required components with the relevant data, for example providing the videos to video frame extraction component 508, providing the video responsive to its rank being higher than ranks associated with code segments extracted from other videos, or the like.

The apparatus may further comprise video receiving component 506 for receiving a video stream or video file from a source, the video stream or file comprising video frames. The video stream may be encoded using any known or to be known encoding method.

The apparatus may further comprise video frame extraction component 508 for extracting one or more frames from a video stream in which code is to be searched, and video frame analysis component 512 for identifying a code pane within the frame.

The apparatus may also comprise statistical model extraction component 516 for extracting a statistical model related to the text of the code, such as word frequency, word combinations, or the like.

The apparatus may further comprise OCR engine 520 for recognizing text within the bounding box of the code pane, wherein OCR engine 520 may also use the statistical model determined by statistical model extraction component 516 to obtain improved results. It will be appreciated that OCR engine 520 may be any commercially available or any proprietary OCR engine.

The apparatus may further comprise related information retrieval component 524 for retrieving information such as code segments similar to a given or selected segment, text representation of the code, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A method for providing a video in response to a query, the method comprising using at least one hardware processor for:
    receiving a multiplicity of videos from a source;
    for each video:
        receiving meta data related to the video;
        extracting from the video a video frame containing computer code;
        identifying a region of interest (ROI) within the video frame;
        performing optical character recognition (OCR) of the ROI to extract a code segment;
        analyzing the code segment, said analyzing comprising:
            (a) semantically analyzing the code segment to obtain a first rank,
            (b) structurally analyzing the code segment to obtain a second rank, and
            (c) analyzing the meta data to obtain a third rank; and
        combining the first rank, second rank and third rank into a total rank associated with the code segment;
    receiving a query;
    matching the query to each code segment to identify matching code segments and associated videos; and
    providing the associated videos in accordance with total ranks associated with the matching code segments.

2. The method according to claim 1, further comprising displaying to a user a list of videos from which code segments being associated with highest ranks have been extracted.

3. The method according to claim 1, further comprising displaying to a user a video from which the code segment has been extracted, wherein the video starts in a frame in which the code segment is displayed.

4. The method according to claim 3, further comprising displaying to a user a list of additional videos related to a video from which the code segment has been extracted.

5. The method according to claim 1, wherein performing OCR of the ROI comprises using a statistical language model.

6. The method according to claim 5, wherein the statistical model is associated with a programming language of the code segment.

7. The method according to claim 1, wherein performing OCR uses results of semantic analysis of the code segment for enhancing results.

8. The method according to claim 1, wherein semantically analyzing the code segment relates to at least one item selected from the group consisting of: cross-dependencies between the code segment and external code; a part of the code segment relevant to the query; and representativity of the code segment.

9. The method according to claim 1, wherein structurally analyzing the code segment relates to at least one item selected from the group consisting of: simplicity; being error-free; and adjustment to coding style or common practice.

10. The method according to claim 1, wherein analyzing the meta data relates to at least one item selected from the group consisting of: credibility of a user providing the code segment; credibility of a user recommending the code segment; characteristics of code previously viewed by a user searching for the code segment; code recency; code size; code credibility; code usability; upvotes; likes; dislikes; and number of comments.

11. The method according to claim 1, wherein the first rank, second rank and third rank are combined into the total rank using a weighted average.

12. The method according to claim 1, wherein identifying a region of interest containing code within the video frame and performing OCR are performed offline prior to a query being received.

13. The method according to claim 1, wherein the video frame is a video frame containing an Integrated Development Environment (IDE) screen image, and wherein the ROI is a code containing pane of the IDE.

14. A computerized apparatus comprising a processor and a non-transient memory, the non-transient memory having stored thereon program code for execution by said processor, the program code comprising:
- a video receiving component for receiving a multiplicity of videos from a source;
- a meta data receiving component for receiving meta data related to each video;
- a frame extraction component for extracting from the video a video frame containing computer code;
- a frame analysis component for identifying a region of interest (ROI) within the video frame; and
- an OCR engine for performing optical character recognition (OCR) of the ROI to extract code segment;
- a semantic analysis component for semantically analyzing the code segment to obtain a first rank;
- a structural analysis component for structurally analyzing the code segment to obtain a second rank;
- a meta data analysis component for analyzing the meta data to obtain a third rank;
- a ranking component for combining the first rank, second rank and third rank into a total rank associated with the code segment;
- a query receiving component for receiving a query;
- a query matching component for matching the query to each code segment to identify matching code segments and associated videos; and
- a result providing component for providing the associated videos in accordance with total ranks associated with the matching code segments.

15. The computerized apparatus according to claim 14, further comprising a user interface for displaying to a user a list of videos from which code segments being associated with highest ranks have been extracted.

16. The computerized apparatus according to claim 15 wherein the user interface displays to a user a video from which the code segment has been extracted, wherein the video starts in a frame in which the code segment is displayed.

17. The computerized apparatus according to claim 15, wherein the user interface is further adapted to display to a user a list of additional videos related to a video from which the code segment has been extracted.

18. The computerized apparatus according to claim 14, wherein the OCR engine is adapted to use a statistical language model.

19. The computerized apparatus according to claim 18, wherein the statistical language model is associated with a programming language of the code segment.

20. The computerized apparatus according to claim 14, wherein the OCR engine is adapted to use results of semantic analysis of the code segment.

21. The computerized apparatus according to claim 14, wherein the video frame is a video frame containing an Integrated Development Environment (IDE) screen image, and wherein the ROI is a code containing pane of the IDE.

22. A computer program product for providing a video in response to a query, the computer program product comprising a non-transitory computer-readable storage medium having program code embodied therewith, the program code executable by at least one hardware processor to:
- receive a video from a source;
- receive meta data related to the video;
- extract from the video a video frame containing computer code;
- identify a region of interest (ROI) within the video frame;
- perform optical character recognition (OCR) of the ROI to extract a code segment;
- analyze the code segment, comprising:
  - (a) semantically analyze the code segment to obtain a first rank,
  - (b) structurally analyze the code segment to obtain a second rank, and
  - (c) analyze the meta data to obtain a third rank;
- combine the first rank, second rank and third rank into a total rank associated with the code segment;
- receive a query;
- match the query to each code segment to identify matching code segments and associated videos; and
- provide the associated videos in accordance with total ranks associated with the matching code segments.

* * * * *